United States Patent
Habuta et al.

(10) Patent No.: US 8,007,887 B2
(45) Date of Patent: Aug. 30, 2011

(54) OPTICAL INFORMATION RECORDING MEDIUM AND METHOD FOR MANUFACTURING THE SAME

(75) Inventors: Haruhiko Habuta, Osaka (JP); Morio Tomiyama, Nara (JP); Hideki Kitaura, Kyoto (JP)

(73) Assignee: Panasonic Corporation, Osaka (JP)

( * ) Notice: Subject to any disclaimer, the term of this patent is extended or adjusted under 35 U.S.C. 154(b) by 663 days.

(21) Appl. No.: 12/092,044

(22) PCT Filed: Oct. 30, 2006

(86) PCT No.: PCT/JP2006/321677
§ 371 (c)(1),
(2), (4) Date: Apr. 29, 2008

(87) PCT Pub. No.: WO2007/052614
PCT Pub. Date: May 10, 2007

(65) Prior Publication Data
US 2009/0263613 A1     Oct. 22, 2009

(30) Foreign Application Priority Data
Oct. 31, 2005   (JP) .................. 2005-315723

(51) Int. Cl.
*B32B 3/02* (2006.01)
(52) U.S. Cl. ............... 428/64.1; 428/64.4; 428/64.5; 428/64.6; 430/270.13
(58) Field of Classification Search ............. None
See application file for complete search history.

(56) References Cited

U.S. PATENT DOCUMENTS

| | | | |
|---|---|---|---|
| 6,229,785 B1 | 5/2001 | Kitaura et al. | |
| 6,610,380 B2* | 8/2003 | Kitaura et al. | 428/64.1 |
| 6,768,710 B2* | 7/2004 | Kitaura et al. | 369/100 |
| 7,057,252 B2* | 6/2006 | Uno et al. | 257/432 |

(Continued)

FOREIGN PATENT DOCUMENTS

CN         1479287         3/2004
(Continued)

OTHER PUBLICATIONS

Chinese Office Action issued Oct. 23, 2009 in Application No. 200680040024.3.

(Continued)

*Primary Examiner* — Elizabeth Mulvaney
(74) *Attorney, Agent, or Firm* — Wenderoth, Lind & Ponack, L.L.P.

(57) ABSTRACT

An optical information recording medium that can simultaneously achieve both a high transmittance and high signal quality of an information layer, improve the reliability of long-term conservation, and reduce the manufacturing cost, and a manufacturing method thereof are provided. In an optical information recording medium including at least one information layer on a substrate, at least one of the information layers has a recording layer and a dielectric layer, the recording layer contains Te, O, and M (M is one or a plurality of elements selected from Au, Pd, and Pt) as major components, the dielectric layer has a thermal conductivity of 0.01 W/K·cm or more, and the dielectric layer has an extinction coefficient of 0 through 1.0 inclusive.

16 Claims, 4 Drawing Sheets

U.S. PATENT DOCUMENTS

| | | |
|---|---|---|
| 7,143,426 B2 | 11/2006 | Mishima et al. |
| 7,485,355 B2 * | 2/2009 | Kitaura et al. ............... 428/64.4 |
| 2001/0016242 A1 | 8/2001 | Miyamoto et al. |
| 2002/0022105 A1 | 2/2002 | Kitaura et al. |
| 2002/0122366 A1 | 9/2002 | Kitaura et al. |
| 2004/0022987 A1 | 2/2004 | Ashida et al. |
| 2004/0126623 A1 | 7/2004 | Shirai et al. |
| 2004/0139459 A1 | 7/2004 | Mishima et al. |
| 2004/0190432 A1 | 9/2004 | Ichihara et al. |
| 2004/0253539 A1 * | 12/2004 | Uno et al. ................ 430/270.13 |
| 2005/0003134 A1 | 1/2005 | Rijpers et al. |
| 2005/0082162 A1 * | 4/2005 | Uno et al. ................ 204/192.26 |
| 2005/0202204 A1 | 9/2005 | Nishihara et al. |
| 2005/0253210 A1 | 11/2005 | Uno et al. |
| 2006/0072439 A1 | 4/2006 | Kitaura et al. |
| 2007/0077521 A1 * | 4/2007 | Habuta et al. ............ 430/270.11 |

FOREIGN PATENT DOCUMENTS

| | | |
|---|---|---|
| CN | 1553446 | 12/2004 |
| CN | 1689088 | 10/2005 |
| EP | 1 180 767 | 2/2002 |
| EP | 1 385 160 | 1/2004 |
| EP | 1 548 722 | 6/2005 |
| JP | 58-54338 | 3/1983 |
| JP | 2001-155380 | 6/2001 |
| JP | 2002-133712 | 5/2002 |
| JP | 2002-251778 | 9/2002 |
| JP | 2004-220758 | 8/2004 |
| JP | 2004-227622 | 8/2004 |
| JP | 2005-293821 | 10/2005 |
| WO | 98/09823 | 3/1998 |
| WO | 2004/027770 | 4/2004 |
| WO | 2004/032130 | 4/2004 |

OTHER PUBLICATIONS

Supplementary European Search Report issued Jun. 22, 2009 in counterpart European Application No. 06812186.

Supplementary European Search Report issued Feb. 4, 2009 in connection with EP 06 81 2186 corresponding to the present U.S. application.

International Search Report issued Jan. 23, 2007 in International (PCT) Application No. PCT/JP2006/321677.

European Patent Office Summons to Attend Oral Proceedings issued May 27, 2011 in corresponding European Application No. 06 812 186.2.

Lugueva et al., "The Effect of Structural Defects on the Thermal Conductivity of ZnS, ZnSe and CdTe Polycrsytals" *Thermophysical Properties of Materials*; vol. 42, No. 1; pp. 58-63; c. 2004.

Lambropoulos et al.; "Thermal Conductivity of Dielectric Films", *Journal of Applied Physics*; vol. 66, No. 9; pp. 4230-4242; c. 1989.

Morelli et al.; "Thermal Conductivity of Germanium, Silicon and Carbon Nitrides"; *Applied physics letters*; vol. 81, No. 27, pp. 5126-5128; c. 2002.

\* cited by examiner

OPTICAL INFORMATION RECORDING MEDIUM AND METHOD FOR MANUFACTURING THE SAME

BACKGROUND OF THE INVENTION

I. Technical Field

The present invention relates to an optical information recording medium that makes it possible to record and reproduce an information signal by irradiating a thin film formed on a substrate with a high-energy light beam, such as a laser beam or the like, and a method for manufacturing the same.

II. Description of the Related Art

Phase-change type recording media are known as media that makes it possible to record and reproduce a large amount of information with high speed. In phase-change type recording media, recording is performed by utilizing a phenomenon that a recording material thereof is changed to an optically distinguishable state due to heat generated by locally irradiating the recording material with laser light. Phase-change type recording media enable random access as required and have excellent portability, and therefore, are becoming more and more important in recent years. For example, there is an increasing demand in various fields, such as recording or conservation of private data, video information, or the like via computers, the medical field, the academic field, replacement of home video tape recorders, and the like.

At present, larger capacity, higher density, and higher speed are required for phase-change type recording medium as the performance of applications and image information are improved.

Conventionally proposed medium types include rewritable media in which information can be written and erased many times, and write-once media that can be written once. In general, most write-once media includes a smaller number of layers than those of rewritable media, and therefore, are easy to manufacture, i.e., can be manufactured at a lower cost. Write-once media are also convenient when the user wants to write data that is not to be damaged, since they are not rewritable. Therefore, there is a large demand for write-once media, which provide long-life conservation and high reliability, in archival applications.

As a write-once recording material, several oxide materials have been proposed. For example, it has been disclosed that recording materials obtained by diffusing Te particles into oxide base materials, such as $GeO_2$, $TeO_2$, $SiO_2$, $Sb_2O_3$, $SnO_2$, and the like, provide high sensitivity and large signal amplitudes (see Japanese Unexamined Patent Publication No. S58-54338). For example, it is known that recording materials containing Te—O—Pd as a major component exhibit large signal amplitudes and considerably high reliability (see International Publication WO98/09823). These Te—O—Pd-based recording materials have a recording mechanism that is considered as follows. The Te—O—Pd film after formation is a composite material in which Te—Pd, Te, or Pd is uniformly diffused as fine particles in $TeO_2$. After irradiation with laser light, melted Te, Te—Pd, or Pd is precipitated as large crystal particles, leading to a change in optical state. Such a change can be detected as a signal.

On the other hand, in recent years, as the amount of information increases, there is a demand for a further increase in recording density of optical information recording media. Therefore, it is necessary to develop a recording medium that can enable high-density recording using a shorter wavelength/higher NA optical system (particularly, blue-violet laser light).

Therefore, it has been proposed that a dielectric layer is additionally provided to a recording layer to increase a reflectance difference so as to use the above-described Te—O—Pd recording material in a blue-violet wavelength region (see Japanese Unexamined Patent Publication No. 2002-133712). Also, in general, a dielectric material is provided on both sides of the recording layer for the purpose of protecting the recording layer and increasing the reflectance difference, and a reflection layer is provided between a substrate and a dielectric layer that is located on a side opposite to the laser incident side of the recording layer for the purpose of effectively diffusing heat generated in the recording layer in the thickness direction to increase the reflectance.

Also, in order to further increase the recording density, there are multilayer media having a plurality of layers into which information is recorded. In such media, when data is recorded into an information layer that is located farther from the light incident surface, laser light needs to be transmitted through an information layer closer to the light incident surface. Therefore, the information layer closer to the light incident surface needs to secure satisfactory signal quality, while it maintains a high transmittance with respect to laser light. The material containing Te—O—Pd as a major component contains $TeO_2$, which is substantially transparent, as a base material, so that it is easy to increase the transmittance of the film, and therefore, can be appropriately applied to multilayer optical information media in which information can be recorded onto multiple information layers from one side.

An example in which four information layers are fabricated using a Te—O—Pd recording material has been proposed (see International Publication WO2004/027770). In this case, a reflection layer is not used for three recording layers closer to the laser incident side, and each of the recording layers is sandwiched by dielectric layers, where the dielectric layer is made of $ZnS$—$SiO_2$. In this case, however, the jitter of recorded signals is disadvantageously low. The reason is considered that heat generated in the recording layer is diffused in the in-plane direction because it can not be diffused in the thickness direction, so that the edges of recorded marks are blurred.

As described above, in phase-change type recording media, a large amount of heat is generated in the recording layer during recording. Therefore, thermal diffusion occurs in the in-plane direction of the recording layer, so that the edges of recorded marks become unclear.

A heat radiation layer is typically provided so as to diffuse such heat. The heat radiation layer is made of a metal that has a large level of light absorption with respect to laser light. On the other hand, in the case of media having multiple information layers, the transmittances of layers closer to the light incident surface need to be increased so as to secure appropriate reflectances of all of the layers. Therefore, it is difficult to select a material that is capable of reducing light absorption while securing heat radiation performance.

Also, in order to increase signal quality and reliability, an information layer typically includes multiple layers, i.e., a heat radiation layer, a dielectric layer, a recording layer, and a dielectric layer, so that the material cost and manufacturing cost of an optical information recording medium increase.

Further, typically, the heat radiation layer is made of an Ag alloy, and the dielectric layer is made of $ZnS$—$SiO_2$. Accordingly, corrosion occurs due to a reaction of Ag and S. As a result, when an Ag alloy is used, there is a problem with reliability.

Therefore, there is a strong desire for a large-capacity optical information recording medium that has a high level of long-term conservation reliability and low manufacturing cost, and simultaneously achieves both high signal quality and a high transmittance.

SUMMARY OF THE INVENTION

An object of the present invention is to provide an optical information recording medium that can simultaneously achieve both a high transmittance and high signal quality, increase the reliability of long-term conservation, and reduce manufacturing cost, and a method for manufacturing the same.

To achieve the object, the present invention provides an optical information recording medium comprising at least one information layer on a substrate. At least one of the information layers has a recording layer and a dielectric layer. The recording layer contains Te, O, and M (M is one or a plurality of elements selected from Au, Pd, and Pt) as major components. The dielectric layer has an extinction coefficient of 0 through 1.0.

The present invention also provides a method for manufacturing the optical information recording medium, in which, on a substrate, a recording layer containing O, and M (M is one or a plurality of elements selected from Au, Pd, and Pt) as major components, and a dielectric layer containing, as a major component, at least one selected from AlN, BN, $Si_3N_4$, HfN, TaN, TiN, ZrN, SiC, BeO, $Al_2O_3$, MgO, ZnO, $TiO_2$, C, and NbC, are formed using a vapor-phase thin film deposition technique.

According to the present invention, it is possible to provide a high-capacity and low-cost optical information recording medium that can simultaneously achieve both a high transmittance and high signal quality, and achieve an excellent reliability with respect to long-term conservation. Also, according to the information recording medium manufacturing method of the present invention, an information recording medium exhibiting the above-described effect can be manufactured.

DETAILED DESCRIPTION OF THE INVENTION

Hereinafter, an optical information recording medium according to the present invention and a manufacturing method thereof will be described, by way of embodiments, with reference to the accompanying drawings. Note that the embodiments below are only for illustrative purposes, and the present invention is not limited to the embodiments below. Also, in the embodiments below, similar parts are indicated by similar symbols and will not be repeatedly described.

The optical information recording medium of the present invention has a substrate and an information layer. The information layer may include at least a recording layer and a dielectric layer.

Figure 1:
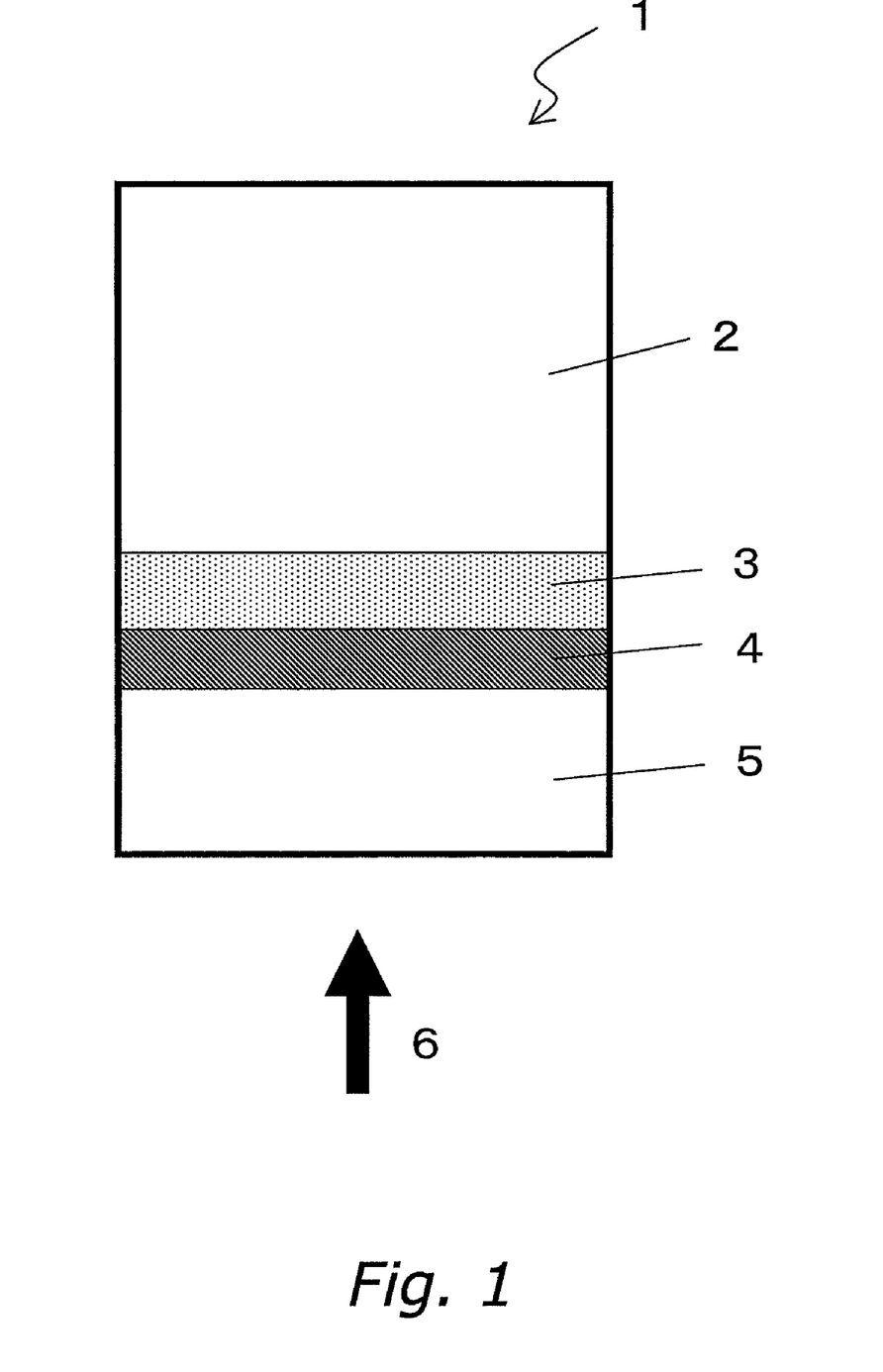
FIG. 1 is a cross-sectional view of an exemplary structure of an optical information recording medium according to the present invention.

Specifically, as shown in FIG. 1, the optical information recording medium 1 of the present invention has an information layer including a first dielectric layer 3 and a recording layer 4 on a substrate 2. A light transparent layer 5 may be further formed on the information layer. A dielectric layer may be inserted between the recording layer 4 and the light transparent layer 5, as required, so as to adjust optical characteristics so that effective light absorption is enabled in the information layer. Information is recorded onto and reproduced from the optical information recording medium by irradiation with laser light 6 from the light transparent layer 5's side.

Figure 2:
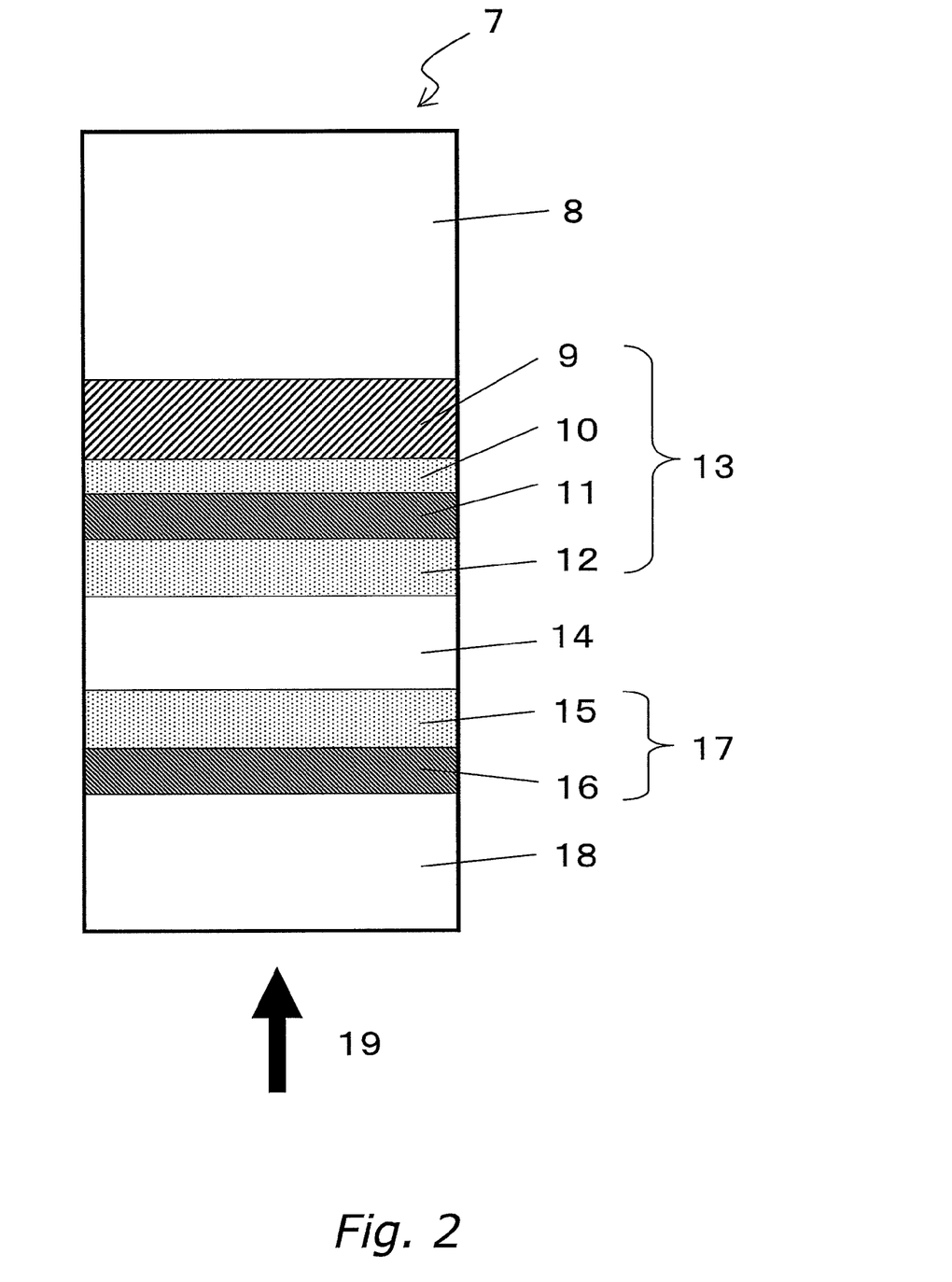
FIG. 2 is a cross-sectional view of an exemplary structure of an optical information recording medium according to the present invention.

Also, as shown in FIG. 2, an optical information recording medium 7 according to the present invention may have, on a substrate 8, a first information layer 13 and a second information layer 17, which are formed one on the top of another in the stated order. An intermediate layer 14 is interposed as a separation layer between the two information layers so as to optically separate one information layer from the other to eliminate unnecessary optical interference. A light transparent layer 18 may be further formed on the second information layer 17. Information is recorded onto and reproduced from the optical information recording medium 7 by irradiation with laser light 19 from the light transparent layer 18's side.

The first information layer 13 can include a reflection layer 9, a second dielectric layer 10, a recording layer 11, and a second dielectric layer 12, which are formed one on the top of another, so as to simultaneously achieve both a high reflectance and high signal quality. The second information layer 17 includes a first dielectric layer 15 and a recording layer 16 so as to simultaneously achieve both a high transmittance and high signal quality.

A dielectric layer may be inserted between the recording layer 16 and the light transparent layer 18, as required, so as to adjust optical characteristics so that it is possible to realize an effective light absorption in the information layer. A reflection layer made of an alloy material or the like can be provided in addition to the recording layer and the dielectric layer.

Figure 3:
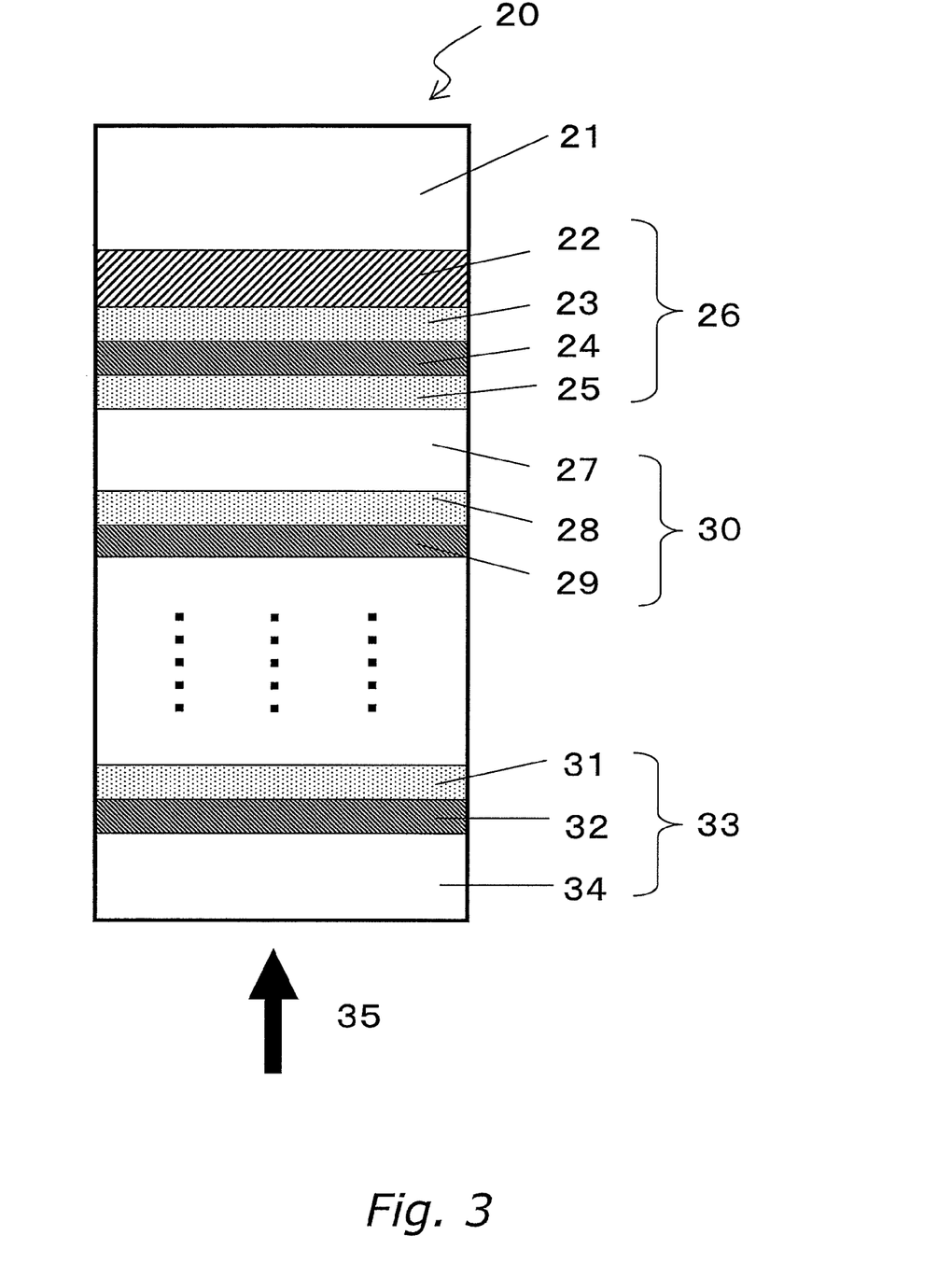
FIG. 3 is a cross-sectional view of an exemplary structure of an optical information recording medium according to the present invention.

Also, as shown in FIG. 3, an optical information recording medium 20 according to the present invention may have, on a substrate 21, a first information layer 26, a second information layer 30, . . . , and an $n^{th}$ information layer 33, which are formed one on the top of another in the stated order. An intermediate layer 27 is interposed between each information layer. Information is recorded onto and reproduced from the optical information recording medium 20 by irradiation with laser light 35 from a light transparent layer 34's side.

The first information layer 26 includes a reflection layer 22, a second dielectric layer 23, a recording layer 24, and a second dielectric layer 25, which are formed one on the top of another, so as to simultaneously achieve both a high reflectance and high signal quality. The second information layer 30 to the $n^{th}$ information layer 33 each include at least a first dielectric layer and a recording layer so as to simultaneously achieve both a high transmittance and high signal quality. A dielectric layer may be inserted between the recording layer and the light transparent layer and between the recording layer and the intermediate layer, as required, so as to adjust optical characteristics so that it is possible to realize an effective light absorption in the information layer. A reflection layer made of an alloy material or the like can be provided in addition to the recording layer and the dielectric layer.

In the present invention, when a plurality of information layers are provided, at least one of them may include a first dielectric layer and a recording layer. The same is true of the second information layer of FIG. 2 and the second to no information layers of FIG. 3. On the other hand, the optical information recording medium of the present invention may further comprise an information layer that does not contain a material for the above-described recording layer. For example, a rewritable or reproduction-only information layer may be added at any position, rather than a write-once information layer.

Also, the information layer may be formed on one side or both sides of the substrate. In the latter case, for example, two optical information recording media in each of which one or a plurality of information layers are formed on a substrate may be attached together with their substrates facing each other (double-sided structure). Thereby, the amount of information that can be stored per medium can be doubled.

Examples of materials for the substrates 2, 8, and 21 include transparent polycarbonate resin, polymethylmethacrylate resin, polyolefin resin, norbornene resin, UV-curable resin, glass, and a combination thereof, and the like. The thicknesses of the substrates are not particularly limited, and are preferably about 0.01 to 1.5 mm. Also, the shapes of the substrates are not particularly limited, and are preferably a disc-like shape.

Materials for the light transparent layers 5, 18, and 34 preferably have a low level of light absorption with respect to the wavelength of laser light 19, and a small magnitude of optical birefringence in a short-wavelength region. For example, a material similar to that for the substrate can be used. The thicknesses of the light transparent layers are not particularly limited, and are preferably about 0.01 to 1.5 mm.

It is also important to set the thicknesses of the light transparent layers 5, 18, and 34 so that the occurrence of information error due to dust, scratches, or the like on the laser light incident surface is reduced as less as possible when a signal is recorded into or reproduced from each information recording layer. The larger the thickness is, the higher the resistance to dust or scratches is. For example, in general, dirt whose size is smaller than or equal to 30 µm accounts for 90% or more in environments in which optical discs are handled (ISOM/ODS2002). Therefore, the thicknesses of the light transparent layers need to be set such that dirt having a size of 30 µm or less can be ignored. In this example, in view of that which has been described above, the thicknesses of the light transparent layers 5, 18, and 34 are set to be about 60 µm.

In particular, when the objective lens has a numerical aperture of 0.75 through 0.95 (the term "through" is used to refer to a range of values, including the ones that start and end the range, and the same is true of the description below), the thicknesses of the substrates 2, 8, and 21 are preferably within the range of 1.00 through 1.20 mm so as to maintain the strength as it was during manufacture of the disc, and the thicknesses of the light transparent layer 5, 18, and 34 are preferably within the range of 0.03 mm through 0.20 mm so as to reduce a permissible range of tilt.

On the other hand, when the numerical aperture of the objective lens is 0.55 through 0.75, the thicknesses of the substrates 2, 8, and 21 are preferably within the range of 0.50 through 0.70 mm, and the thicknesses of the light transparent layers 5, 18, and 34 are preferably within the range of 0.50 mm through 0.70 mm.

Materials for the intermediate layers 14 and 27 may be similar to those for the substrate. The thicknesses of the intermediate layers 14 and 27 need to be larger than or equal to at least the depth of focus that is determined by the numerical aperture NA of the objective lens and the wavelength $\lambda$ of laser light so that, when information is reproduced from one of the first information layer, the second information layer, and the $n^{th}$ information layer, crosstalk from the other layers is small. The thicknesses of the intermediate layers 14 and 27 also need to be such that all of the information layers fall within a range in which focus can be achieved. When three or more information layers are stacked, the intermediate layers preferably have different thicknesses. This is because, when the intermediate layers have the same thickness, the information layers are equally spaced, and therefore, when information is recorded onto or reproduced from a certain layer, laser light may come into a focus on the second layer above the certain layer, so that crosstalk is likely to be large. Since the amount of crosstalk in a multilayer medium is proportional to the thickness of an intermediate layer, the thickness of the intermediate layer is preferably as large as possible.

In an optical information recording medium comprising, on a substrate, a first information layer, a first intermediate layer, a second information layer, a second intermediate layer, a third information layer, a third intermediate layer, a fourth information layer, and a light transparent layer, which are formed one on the top of another in the stated order, intermediate layers preferably have different thicknesses, specifically, the thickness of the third intermediate layer<the thickness of the first intermediate layer<the thickness of the second intermediate layer. This is based on the following idea.

In the optical information recording medium including the four layers, the first information layer and the second information layer, which has information layers on both sides thereof, are most likely to be affected by crosstalk, so that jitter is likely to be deteriorated. Therefore, the thicknesses of the second information layer and the first information layer need to be the largest so as to minimize the crosstalk amount. Next, signal quality is more easily deteriorated in the first information layer than in the second information layer since two information layers are provided on the laser incident side of the first information layer. Therefore, next, the crosstalk amount is preferably further reduced by increasing the thickness of the first intermediate layer. Thus, the third intermediate layer is the thinnest.

Further, in the optical information recording medium including the four layers, the thinnest third intermediate layer preferably has a thickness of 6 µm through 15 µm. This structure reduces the influence of inter-layer crosstalk to the minimum level when recording and reproduction are performed by a head employing laser light having a wavelength of 400 through 410 nm and an objective lens having a numerical aperture of 0.85, and also reduces the thickness of the light transparent layer.

The substrates 2, 8, and 21, the light transparent layers 5, 18, and 34, and the intermediate layers 14 and 27 preferably have a refractive index within the range of 1.4 through 1.7. In this case, a sufficient optical change can be secured between a recorded state and an unrecorded state. Also, a guide groove or a pit for guiding laser light may be preferably formed in a surface closer to an information layer of at least any one of the substrates 2, 8, and 21, the light transparent layers 5, 18, and 34, and the intermediate layers 14 and 27.

The recording layers 4, 11, 16, 24, 29, and 32 are made of a material that can fall into two or more states having different optical characteristics. The recording layer material is preferably one that is irreversibly changed between the different states. A material containing Te—O-M (M indicates one or a plurality of elements selected from Au, Pd, and Pt) as a major component is preferable. Here, the term "major component(s)" means that the recording layer contains the component(s) in an amount of 50 mol % or more. The material also preferably contains oxygen atoms (O) in an amount of 40 atom % through 75 atom % so as to secure the size of a recorded mark and maintain an appropriate range of thermal conductivity of the recording layer. The material also preferably contains Te in an amount of 20 through 50 atom % and Pd in an amount of 3 through 20 atom % so as to secure a sufficient change in optical characteristics during irradiation with laser light, and obtain an appropriate C/N ratio and an appropriate crystallization rate.

The recording layer may contain elements other than 0 and M. For example, at least one element selected from S, N, F, B, and C may be added for the purpose of adjusting a thermal conductivity or an optical constant, improving heat resistance and environmental reliability, or the like. The amount of these added elements is preferably within 20 atom % of the whole recording layer.

The recording layer preferably has a film thickness of 1 nm through 30 nm. This is because a sufficient C/N ratio is likely to be obtained for recording and reproduction characteristics, or the C/N ratio is prevented from decreasing during high-density recording by adjusting thermal diffusion in the in-plane direction of the recording layer. In particular, the film thickness of the recording layer is preferably 5 nm or more so as to obtain a sufficient reflectance and change in reflectance, and increase the C/N ratio.

When an optical information recording medium includes four layers, film thickness preferably varies between the recording layers. This is because different reflectances and transmittances are required for the layers. In the optical information recording medium including the four layers, the layers are, for example, represented by L0, L1, L2, and L3 in order of depth as viewed from the laser incident side, the deepest first. The film thickness of L0 is preferably 10 nm through 40 µm. The film thickness of L1 is preferably 4 nm through 14 µm. The film thickness of L2 is preferably 4 nm through 12 nm. The film thickness of L3 is preferably 4 nm through 10 µm. The film thickness of L0 is preferably larger than 10 nm so as to obtain a sufficient optical change. The film thickness of L0 is preferably smaller than 40 nm so as to obtain a sufficient reflectance. The film thicknesses of L1, L2, and L3 are preferably larger than 4 nm since a sufficient optical change is obtained. L1, L2, and L3 are preferably smaller than 14 nm, 12 nm, and 10 nm, respectively, since a sufficient transmittance is obtained. Since the film thickness of the recording layer L0 is particularly preferably 20 nm, the ratio of the recording layers of the optical information recording layer including the four layers is preferably L0:L1:L2:L3=1: 0.2 through 0.7:0.2 through 0.6:0.2 through 0.5, so that all of the layers can be easily balanced.

The recording layer preferably has a thermal conductivity of as low as 0.1 W/K·cm or less. When the thermal conductivity is high, heat is diffused in the in-plane direction during recording, resulting in a decrease in jitter. Therefore, a satisfactory level of jitter can be easily obtained by reducing the thermal conductivity of the recording layer.

The first dielectric layers 3, 15, 28, and 31, when the first dielectric layer is not provided with a reflection layer, need to be made of a material having a high thermal conductivity so as to play a role in diffusing heat generated in the recording layer in the in-plane direction thereof. The first dielectric layers 3, 15, 28, and 31 are also provided mainly for the purpose of adjusting optical characteristics to enable protection of the recording material, effective light absorption in the information layer, or the like. Further, the extinction coefficient of the dielectric layer is preferably small so as to increase the transmittance of the information layer since the dielectric layer is applied to a layer on the laser incident side of the multilayer optical information recording medium. To achieve such a purpose, the thermal conductivity, film thickness, and extinction coefficient of the first dielectric layer fall within the following preferable ranges.

The thermal conductivity of the first dielectric layer is preferably as high as 0.01 W/K·cm or more. When the thermal conductivity is 0.01 W/K·cm or more, heat generated in the recording layer is easily diffused in the in-plane direction thereof, so that the edge of a signal becomes clear, and therefore, jitter is improved.

Also, a relatively transparent material having an extinction coefficient of 0 through 1.0 in a wavelength region in the vicinity of 405 nm is preferable. When the extinction coefficient is 0 through 1.0, the proportion of light absorbed in the dielectric layer is small, so that the transmittance of the information layer can be increased. When the extinction coefficient is larger than 1.0, light absorption in the dielectric layer increases, so that it is difficult to apply the dielectric layer to the multilayer optical information recording medium. A material for the first dielectric layer that satisfies the above-described thermal conductivity and extinction coefficient is, for example, a material containing, as a major component, at least one selected from AlN, BN, $Si_3N_4$, HfN, TaN, TiN, ZrN, SiC, BeO, $Al_2O_3$, MgO, ZnO, $TiO_2$, C, and NbC. Among them, AlN, BN, and MgO are more preferable since they have a large thermal conductivity and an extinction coefficient of as small as 0.1 or less. Here, the term "major component(s)" means that the dielectric layer contains the component(s) in an amount of 50 mol % or more, preferably 80 mol % or more, and more preferably 90 mol % or more.

The first dielectric layer preferably has a film thickness of 1 nm through 40 nm. When the film thickness is 1 nm or more, the first dielectric layer has a sufficient function to protect the recording layer. When the film thickness is 40 nm or less, a time required for film formation is sufficiently short. Therefore, such a film thickness range is preferable in terms of productivity.

The second dielectric layers 10, 12, 23, and 25 are provided mainly for the purpose of adjusting optical characteristics to enable protection of the recording material, effective light absorption in the information layer, or the like.

A material for the second dielectric layer preferably has a refractive index n of 1.5 or more, more preferably 2.0 or more, and even more preferably 2.5 or more. Specifically, examples of the material include sulfides (ZnS, etc.), selenides (ZnSe, etc.), oxides (Si—O, Al—O, Ti—O, Ta—O, Zr—O, Cr—O, etc.), nitrides (Ge—N, Cr—N, Si—N, Al—N, Nb—N, Mo—N, Ti—N, Zr—N, Ta—N, etc.), nitrogen oxides (Ge—O—N, Cr—O—N, Si—O—N, Al—O—N, Nb—O—N, Mo—O—N, Ti—O—N, Zr—O—N, Ta—O—N, etc.), carbides (Ge—C, Cr—C, Si—C, Al—C, Ti—C, Zr—C, Ta—C, etc.), fluorides (Si—F, Al—F, Ca—F, La—F, etc.), and appropriate combinations thereof (e.g., ZnS—$SiO_2$, etc.), and the like.

The reflection layers 9 and 22 are preferably provided so as to obtain a heat radiation effect, and an optical effect, such as effective light absorption in the recording layer or the like. The reflection layers 9 and 22 can be formed of a metal, such as Au, Ag, Cu, Al, Ni, Cr, Ti, or the like, or an alloy of appropriately selected metals. The film thicknesses of the reflection layers 9 and 22 are preferably 1 nm or more. This is for the purpose of causing the film to become a uniform layer and secure thermal and optical effects. Although only the first information layer 13 has the reflection layer 9 in FIG. 2, the second information layer 17 may have a reflection layer, or the first information layer 13 may not have the reflection layer 9. Although only the first information layer 26 has the reflection layer 22 in FIG. 3, the second information layer 30 to the n$^{th}$ information layer 33 may have a reflection layer, or the first information layer 26 may not have the reflection layer 22. In general, when a reflection layer is provided, the transmittance of the information layer decreases, but high signal quality can be easily obtained due to the above-described heat radiation effect or optical effect. Therefore, the second information layer 17 of FIG. 2 and the second information layer 30 to the n$^{th}$ information layer 33 of FIG. 3 that are located on the laser light incident side need to be appropriately designed as to whether or not a reflection layer is provided. The reflection layer allows the information to maintain the transmittance high by setting the thickness of the reflection layer to be, for example, 10 nm or less.

In an optical information recording medium in which information is recorded and reproduced by moving the focus of recording/reproducing light in the thickness direction of the layer structure of FIG. 3 (n is an integer of 3 or more), the farthest layer from the light incident side is represented by L0, and the other layers are represented by L1, L2, . . . , and Ln−1 in order of distance from the light incident side, the farthest first. In this case, L1 to Ln−1 are preferably a recording layer including the above-described particular recording layer and a dielectric layer. In this case, all of L1 to Ln−1 are each preferably the particular recording layer, though at least one of L1 to Ln−1 may be the particular recording layer, or two or more of L1 to Ln−1 may each be the particular recording layer. This is because satisfactory signal quality can be obtained.

In an optical information recording medium in which information is recorded and reproduced by moving the focus of recording/reproducing light in the thickness direction of the layer structure of FIG. 3 (n is an integer of 3 or more, e.g., n=4), when at least three (or n) information layers closer to the light incident side are each the above-described information layer, and an information layer closest to the light incident side is represented by L3 (or Ln−1) and an information layer third closest to the light incident side is represented by L1, the intensities of reflected light returning from the information layers when recording and reproduction light is incident to the optical information recording medium preferably satisfy L3 (or Ln−1)<L1. Thereby, the C/N ratio of L1 can be caused to be higher than or equal to that of L3, so that signal quality can be balanced between L1 and L3.

Also, when an information layer second closest to the light incident side is represented by L2, the intensities of reflected light returning from the information layers when recording and reproduction light is incident to the optical information recording medium preferably satisfy L2<L1. Thereby, the C/N ratio of L1 can be caused to be higher than or equal to that of L2, so that signal quality can be balanced between L1 and L2.

The intensities of reflected light returning from the information layers when recording and reproduction light is incident to the optical information recording medium preferably satisfy L3<L2<L1. Thereby, the C/N ratios of L1 and L2 can be caused to be higher than or equal to that of L3, so that a high degree of modulation is obtained in L1 to L3, and therefore, satisfactory signal quality balanced between L1, L2, and L3 can be obtained.

The above-described adjustment of reflected light intensities can be performed by adjusting the film thicknesses of layers included in the information layer or adjusting a combination of the material and the film thickness of the information layer as described below.

For example, in the second information layer, an AlN dielectric layer having a film thickness of 8 nm is formed using an AlN target, a Te—O—Pd recording layer having a film thickness of 6 nm is formed using a Te—O—Pd (atomicity ratio=37:53:10) target, and a ZnS dielectric layer having a film thickness of 27 nm is formed using a ZnS target, on an intermediate layer formed on the first information layer. In this manufacture method, the intensity of reflected light can be increased by decreasing the film thickness of AlN, increasing the film thickness of ZnS, or decreasing the film thickness of Te—O—Pd. Also, the intensity of reflected light can be decreased by increasing the film thickness of AlN, decreasing the film thickness of ZnS, or increasing the film thickness of Te—O—Pd.

In the third information layer, an AlN dielectric layer having a film thickness of 20 nm is formed using an AlN target, a Te—O—Pd recording layer having a film thickness of 8 nm is formed using a Te—O—Pd (atomicity ratio=37:53:10) target, and a ZnS dielectric layer having a film thickness of 35 nm is formed using a ZnS target, on an intermediate layer formed on the second information layer. In this manufacture method, the intensity of reflected light can be increased by decreasing the film thickness of AlN, decreasing the film thickness of ZnS, or decreasing the film thickness of Te—O—Pd. Also, the intensity of reflected light can be decreased by increasing the film thickness of AlN, increasing the film thickness of ZnS, or increasing the film thickness of Te—O—Pd.

In the fourth information layer, an AlN dielectric layer having a film thickness of 20 nm is formed using an AlN target, a Te—O—Pd recording layer having a film thickness of 6 nm is formed using a Te—O—Pd (atomicity ratio=37:53:10) target, and a ZnS dielectric layer having a film thickness of 45 nm is formed using a ZnS target, on an intermediate layer formed on the third information layer. In this manufacture method, the intensity of reflected light can be increased by decreasing the film thickness of AlN, decreasing the film thickness of ZnS, or decreasing the film thickness of Te—O—Pd. Also, the intensity of reflected light can be decreased by increasing the film thickness of AlN, increasing the film thickness of ZnS, or increasing the film thickness of Te—O—Pd.

In the optical information recording medium comprising, on the substrate, the first information layer, the first intermediate layer, the second information layer, the second intermediate layer, the third information layer, the third intermediate layer, the fourth information layer, and the light transparent layer, which are formed one on the top of another in the stated order, the following structure is preferable: the first to fourth information layers each include at least a recording layer; the recording layer contains Te—O-M (M is one or a plurality of elements selected from Au, Pd, and Pt) as a major component; the first information layer and the second information layer each include a reflection layer containing a Ag alloy or an Al alloy as a major component; the third information layer and the fourth information layer each include a dielectric layer; and the dielectric layer is made of a material containing, as a major component, at least one selected from AlN, BN, $Si_3N_4$, HfN, TaN, TiN, ZrN, SiC, BeO, $Al_2O_3$, MgO, ZnO, $TiO_2$, C, and NbC. This is required for satisfying the target values of reflectance and jitter of all of the layers in the optical information recording medium having the four information layers. The first information layer and the second information layer need to have a high reflectance since two information layers are provided on the laser incident side thereof. Such a high-reflectance is achieved by providing a reflection layer containing a Ag alloy or an Al alloy as a major component. An information layer is further provided on the opposite of the laser incident side of the third information layer and the fourth information layer. Therefore, it is necessary for them to have a high transmittance. To achieve this, a dielectric layer having a high thermal conductivity and a small extinction coefficient made of AlN, BN, $Si_3N_4$, MgO, or the like is provided. Thus, the target values of reflectance and jitter are achieved for all of the four layers by changing a material for providing heat radiation, depending on the layer.

Also, if the second information layer is also provided with a dielectric layer having a high thermal conductivity and a small extinction coefficient made of AlN, BN, $Si_3N_4$, MgO, or the like as in the third and fourth information layers instead of using a reflection layer containing a Ag alloy or an Al alloy as a major component, an effect similar to that described above can be obtained.

Each of the above-described thin films can be formed by a vapor-phase thin film deposition technique, such as vacuum vapor deposition, sputtering, ion plating, CVD (Chemical Vapor Deposition), MBE (Molecular Beam Epitaxy), or the like. Particularly, sputtering is more preferable. To date, sputtering has been most commonly used as an optical disc fabricating technique, and therefore, is preferable in terms of productivity. Sputtering is also preferable in terms of quality since satisfactory film quality can be easily obtained.

A procedure for fabricating each layer is as follows. In the case of FIG. 1, the first dielectric layer 3 and the recording layer 4 are successively formed on the substrate 2, and on the resultant structure, and then the light transparent layer 5 is formed thereon. The light transparent layer 5 may be formed by attaching a base material having an adhesive resin on one side thereof to a medium in which the recording layer 4 has just been formed. Alternatively, the light transparent layer 5 may be may be manufactured by attaching a medium that has been formed until the recording layer 4 and a sheet-like base material together using a UV resin. Alternatively, the light transparent layer 5 may be manufactured by forming a UV-curable resin on a medium in which the recording layer 4 has been just formed. The media of FIGS. 2 and 3 can be fabricated by providing similar film forming steps and steps of forming an intermediate layer and a light transparent layer.

Next, an exemplary method for recording and reproducing the optical information recording medium of the present invention will be described.

Figure 4:
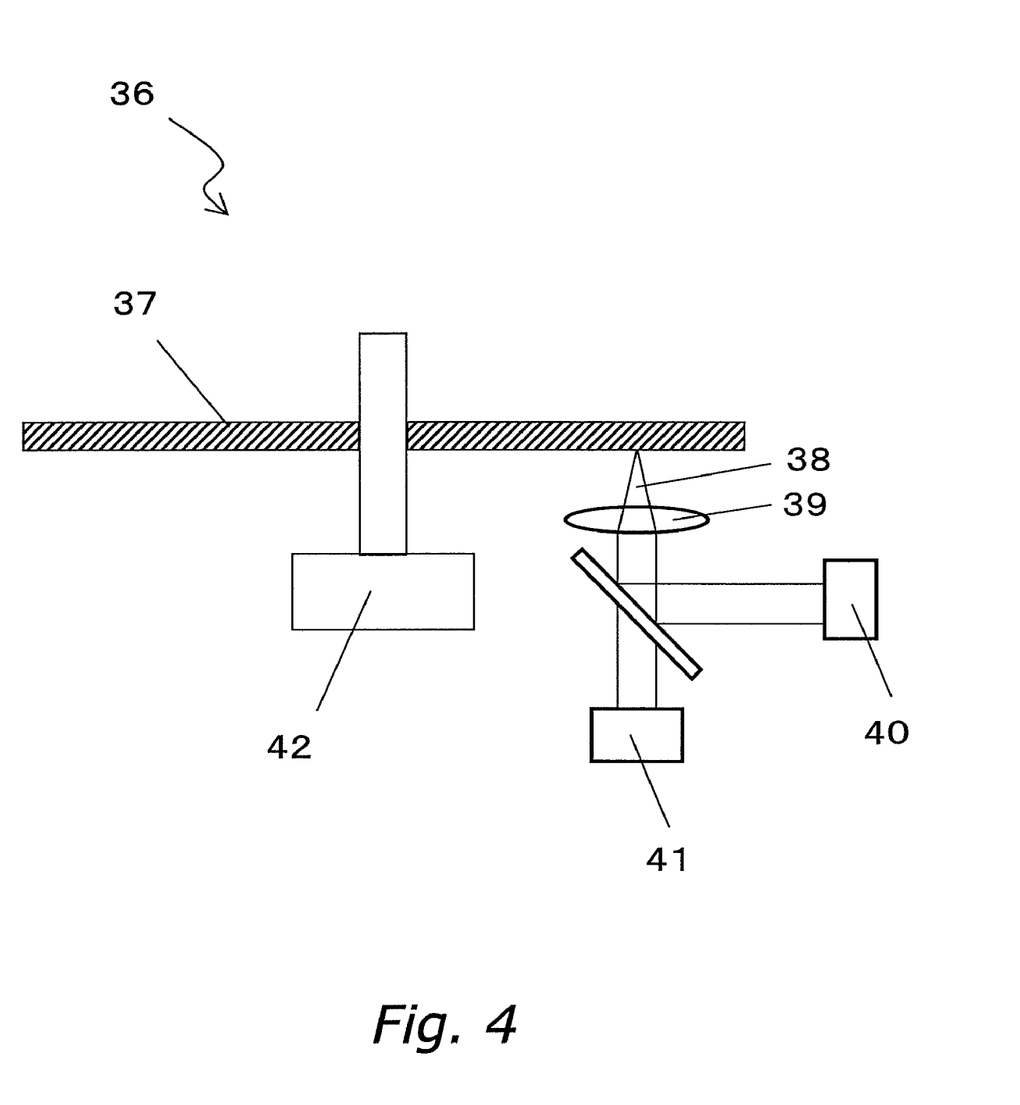
FIG. 4 is a diagram schematically showing a portion of a structure of a recording and reproduction apparatus used for recording and reproduction of the optical information recording medium of the present invention.

FIG. 4 schematically shows an exemplary recording and reproduction apparatus 36 used for recording and reproduction, where the optical information recording medium is an optical disc. Signal recording and reproduction are performed using an optical head (not shown) including a laser 40 and an objective lens 39, a drive device (not shown) for guiding a position irradiated with laser light to a predetermined position, a tracking control device and a focusing control device (not shown) for controlling a position in a track direction and in a direction perpendicular to the film surface, a laser drive device (not shown) for modulating laser power, and a spindle motor 42 for rotating the medium.

Signal recording and reproduction are performed as follows. Initially, the medium is rotated using the spindle motor 42. Laser light is narrowed into a small spot using the optical system. The medium is irradiated with the laser light. When signal reproduction is performed, the medium is irradiated with a laser beam having power that is lower than a power level for signal recording and with which a sufficient amount of light for reproduction of a recorded mark is obtained from the medium while an optical state of the recorded mark is not affected. A signal obtained from the medium can be read by a photodetector 41.

Hereinafter, the present invention will be more specifically described by way of examples. The present invention is not limited by the examples.

Example 1

An optical information recording medium having the layer structure of FIG. 1 was fabricated, and the manufacture method will be described. Here, a dielectric layer is inserted between a recording layer and a light transparent layer so as to adjust optical characteristics to enable effective light absorption in an information layer.

A substrate was made of a polycarbonate resin. The substrate had a diameter of 12 cm, a thickness of 1.1 mm, a groove pitch of 0.32 μm, and a groove depth of 20 nm.

On a surface of the substrate in which a groove is formed, layers constituting a first information layer were formed by sputtering, one on the top of another in the following order. An AlN dielectric layer having a film thickness of 8 nm was formed using an AlN target: a Te—O—Pd recording layer having a film thickness of 6 nm was formed using a Te—O—Pd (atomicity ratio=37:53:10) target; a ZnS dielectric layer having a film thickness of 27 nm was formed using a ZnS target. A light transparent layer having a thickness of 100 μm was formed on a surface of the first information layer using a UV-curable resin that is transparent to laser light.

Each layer was formed using a target having a diameter of about 100 mm and a thickness of about 6 mm. The dielectric layer was formed using an RF power source of 300 W. The recording layer was formed using an RF power source of 100 W. The AlN dielectric layer was formed using a gas mixture of Ar (25 sccm) and nitrogen (0.9 sccm). The recording layer was formed using a gas mixture of Ar (25 sccm) and oxygen (1.6 sccm). The ZnS dielectric layer was formed using Ar (25 sccm). In each case, film formation was performed in an atmosphere in which a gas pressure was maintained at about 0.2 Pa. Thus, a disc A was fabricated.

A disc B was fabricated in a manner similar to that for the disc A, except that a BN dielectric layer having a film thickness of 8 nm was formed using a BN target instead of forming the AlN dielectric layer having a film thickness of 8 nm using an AlN target.

A disc C was fabricated in a manner similar to that for the disc A, except that a $Si_3N_4$ dielectric layer having a film thickness of 8 nm was formed using a $Si_3N_4$ target instead of forming the AlN dielectric layer having a film thickness of 8 nm using an AlN target.

A disc D was fabricated in a manner similar to that for the disc A, except that a HfN dielectric layer having a film thickness of 8 nm was formed using a HfN target instead of forming the AlN dielectric layer having a film thickness of 8 nm using an AlN target.

A disc E was fabricated in a manner similar to that for the disc A, except that a TaN dielectric layer having a film thickness of 8 nm was formed using a TaN target instead of forming the AlN dielectric layer having a film thickness of 8 nm using an AlN target.

A disc F was fabricated in a manner similar to that for the disc A, except that a TiN dielectric layer having a film thickness of 8 nm was formed using a TiN target instead of forming the AlN dielectric layer having a film thickness of 8 nm using an AlN target.

A disc G was fabricated in a manner similar to that for the disc A, except that a ZrN dielectric layer having a film thickness of 8 nm was formed using a ZrN target instead of forming the AlN dielectric layer having a film thickness of 8 nm using an AlN target.

A disc H was fabricated in a manner similar to that for the disc A, except that a SiC dielectric layer having a film thickness of 8 nm was formed using a SiC target instead of forming the AlN dielectric layer having a film thickness of 8 nm using an AlN target.

A disc I was fabricated in a manner similar to that for the disc A, except that a BeO dielectric layer having a film thickness of 8 nm was formed using a BeO target instead of forming the AlN dielectric layer having a film thickness of 8 nm using an AlN target.

A disc J was fabricated in a manner similar to that for the disc A, except that an $Al_2O_3$ dielectric layer having a film thickness of 8 nm was formed using an $Al_2O_3$ target instead of forming the AlN dielectric layer having a film thickness of 8 nm using an AlN target.

A disc K was fabricated in a manner similar to that for the disc A, except that a MgO dielectric layer having a film thickness of 8 nm was formed using a MgO target instead of forming the AlN dielectric layer having a film thickness of 8 nm using an AlN target.

A disc L was fabricated in a manner similar to that for the disc A, except that a ZnO dielectric layer having a film thickness of 8 nm was formed using a ZnO target instead of forming the AlN dielectric layer having a film thickness of 8 nm using an AlN target.

A disc M was fabricated in a manner similar to that for the disc A, except that a $TiO_2$ dielectric layer having a film thickness of 8 nm was formed using a $TiO_2$ target instead of forming the AlN dielectric layer having a film thickness of 8 nm using an AlN target.

A disc N was fabricated in a manner similar to that for the disc A, except that a C dielectric layer having a film thickness of 8 nm was formed using a C target instead of forming the AlN dielectric layer having a film thickness of 8 nm using an AlN target.

A disc O was fabricated in a manner similar to that for the disc A, except that a NbC dielectric layer having a film thickness of 8 nm was formed using a NbC target instead of forming the AlN dielectric layer having a film thickness of 8 nm using an AlN target.

A disc P was fabricated in a manner similar to that for the disc A, except that a ZnS dielectric layer having a film thickness of 15 nm was formed using a ZnS target instead of forming the AlN dielectric layer having a film thickness of 8 nm using an AlN target.

A disc Q was fabricated by forming a AgPdCu reflection layer having a film thickness of 40 nm using a AgPdCu (weight ratio=98.1:0.9:1.0) target, forming a $ZrO_2$—$SiO_2$—$Cr_2O_3$—$LaF_3$ dielectric layer having a film thickness of 20 nm using a $ZrO_2$—$SiO_2$—$Cr_2O_3$—$LaF_3$ (molecularity ratio=23:23:31:23) target, forming a Te—O—Pd recording layer having a film thickness of 20 nm using a Te—O—Pd (atomicity ratio=37:53:10) target, and forming a ZnS—$SiO_2$ dielectric layer having a film thickness of 20 nm using a ZnS—$SiO_2$ (molecularity ratio=80:20) target. These layers were formed, by sputtering, one on the top of another in the stated order.

A single signal of 12.2 MHz was recorded on the thus-fabricated disc so as to test reliability, where an optical system having a wavelength of 405 nm and a numerical aperture NA of 0.85 was used and the disc was rotated at a linear velocity of 4.5 m/s. Information was recorded in an unrecorded track once, and the C/N ratio of the signal was measured using a spectrum analyzer. Here, when the measured C/N ratio was 40 dB or more, the result is represented by "good", and when the measured C/N ratio was less than 40 dB, the result is represented by "bad".

An accelerated test was conducted, where the discs A through D on which data was recorded were left to stand at a temperature of 90 degrees Celsius and a relative humidity of 80% for 50 hours. After the accelerated test, the data was reproduced from the discs A through D to measure the C/N ratios of reproduced signals. Here, when a reduction in C/N ratio was less than 3 dB, the test result is represented by "good", and when the reduction was 3 dB or more, the test result is represented by "bad". Even if the reduction of C/N was less than 3 dB, when a corrosion occurred due to dirt in a film formation chamber or the like, the test result is represented by "insufficient".

The number of information layers is preferably small in terms of manufacturing cost. When the number of information layers was three or less, the disc is represented by "good", and when the number of information layers was four or more, the disc is represented by "bad". The result of the evaluation is shown in Table 1.

TABLE 1

| Disc No. | First dielectric layer or reflection layer/ dielectric layer | Number of layers | C/N ratio | Reliability |
|---|---|---|---|---|
| A | AlN | good | good | good |
| B | BN | good | good | good |
| C | $Si_3N_4$ | good | good | good |
| D | HfN | good | good | good |
| E | TaN | good | good | good |
| F | TiN | good | good | good |
| G | ZrN | good | good | good |
| H | SiC | good | good | good |
| I | BeO | good | good | good |
| J | $Al_2O_3$ | good | good | good |
| K | MgO | good | good | good |
| L | ZnO | good | good | good |
| M | $TiO_2$ | good | good | good |
| N | C | good | good | good |
| O | NbC | good | good | good |
| P | ZnS | good | good | bad |
| Q | AgPdCu/ $ZrO_2$—$SiO_2$—$Cr_2O_3$—$LaF_3$ | bad | good | insufficient |

According to Table 1, the discs A through O were satisfactory in terms of all of the number of layers, C/N ratio, and reliability. However, the disc P having a dielectric layer made of ZnS had a problem with the reliability.

The disc Q has a larger number of layers, and therefore, is not preferable in terms of manufacturing cost. Also, a small amount of corrosion of Ag and S occurred in the disc Q.

Thus, according to the present invention, it was confirmed that an inexpensive monolayer write-once recording medium having high signal quality and excellent reliability can be provided by using as the first dielectric layer a material having a thermal conductivity of as high as 0.01 W/K·cm or more, and an extinction coefficient of 0 through 1.0 in a wavelength region in the vicinity of 405 nm, such as AlN, BN, $Si_3N_4$, HfN, TaN, TiN, ZrN, SiC, BeO, $Al_2O_3$, MgO, ZnO, $TiO_2$, C, or NbC. It was also confirmed that the cases of FIGS. 2 and 3 have a similar effect.

Example 2

An optical information recording medium having the layer structure of FIG. 2 was fabricated, and the manufacture method will be described. Here, three kinds of media were fabricated and compared: (1) a dielectric layer of an information layer on the laser incident side of a two-layer medium was made of AlN having a thermal conductivity of 0.01

W/K·cm or more; (2) the dielectric layer was made of ZnS—SiO$_2$ of 0.01 W/K·cm or less; and (3) a Ag alloy reflection layer and a conventional dielectric layer were used.

A substrate was made of a polycarbonate resin. The substrate had a diameter of 12 cm, a thickness of 1.1 mm, a groove pitch of 0.32 μm, and a groove depth of 20 nm.

On a surface of the substrate in which a groove is formed, layers constituting a first information layer were formed by sputtering in the following order: a AgPdCu reflection layer having a film thickness of 40 nm was formed using a AgPdCu (weight ratio=98.1: 0.9:1.0) target; a ZrO$_2$—SiO$_2$—Cr$_2$O$_3$—LaF$_3$ dielectric layer having a film thickness of 20 nm was formed using a ZrO$_2$—SiO$_2$—Cr$_2$O$_3$—LaF$_3$ (molecularity ratio=23:23:31:23) target; a Te—O—Pd recording layer having a film thickness of 20 nm was formed using a Te—O—Pd (atomicity ratio=37:53:10) target, and a ZnS—SiO$_2$ dielectric layer having a film thickness of 20 nm was formed using a ZnS—SiO$_2$ (molecularity ratio=80:20) target. An intermediate layer having a thickness of about 25 μm was formed on a surface of the first information layer using a UV-curable resin, where the same groove pattern as that of the substrate was transferred to the intermediate layer.

On a surface of this intermediate layer, layers constituting a second information layer were formed by sputtering in the following order: an AlN dielectric layer having a film thickness of 20 nm was formed using an AlN target; a Te—O—Pd recording layer having a film thickness of 8 nm was formed using a Te—O—Pd (atomicity ratio=37:53:10) target; and a ZnS dielectric layer having a film thickness of 35 nm was formed using a ZnS target. A light transparent layer having a thickness of 75 μm was formed on a surface of the second information layer using a UV-curable resin that is transparent for laser light.

Each layer was formed using a target having a diameter of about 100 mm and a thickness of about 6 mm. The dielectric layer was formed using an RF power source of 300 W. The recording layer was formed using an RF power source of 100 W. The reflection layer was formed using a DC power source of 100 W. The AlN dielectric layer was formed using a gas mixture of Ar (25 sccm) and nitrogen (0.9 sccm). The recording layer was formed using a gas mixture of Ar (25 sccm) and oxygen (1.2 sccm). The ZnS dielectric layer, the ZnS—SiO$_2$ dielectric layer, the ZrO$_2$—SiO$_2$—Cr$_2$O$_3$—LaF$_3$ dielectric layer, and the AgPdCu reflection layer were formed using Ar (25 sccm). In each case, film formation was performed in an atmosphere in which a gas pressure was maintained at about 0.2 Pa. Thus, a disc R was fabricated.

A disc S was fabricated by replacing the second information layer of the disc R with the following layer. On the intermediate layer formed on the first information layer, a second information layer including layers was formed by sputtering in the following order: a AgPdCu reflection layer having a film thickness of 10 nm was formed using a AgPdCu (weight ratio=98.1:0.9:1.0) target; a ZrO$_2$—SiO$_2$—Cr$_2$O$_3$—LaF$_3$ dielectric layer having a film thickness of 10 nm was formed using a ZrO$_2$—SiO$_2$—Cr$_2$O$_3$—LaF$_3$ (molecularity ratio=23:23:31:23) target; a Te—O—Pd recording layer having a film thickness of 10 nm was formed using a Te—O—Pd (atomicity ratio=37:53:10) target; and a ZnS—SiO$_2$ dielectric layer having a film thickness of 20 nm was formed using a ZnS—SiO$_2$ (molecularity ratio=80:20) target.

A disc T was fabricated by replacing the second information layer of the disc R with the following layer. On the intermediate layer formed on the first information layer, layers constituting a second information layer were formed by sputtering in the following order: a ZnS—SiO$_2$ dielectric layer having a film thickness of 20 nm was formed using a ZnS—SiO$_2$ (molecularity ratio=80:20) target; a Te—O—Pd recording layer having a film thickness of 8 nm was formed using a Te—O—Pd (atomicity ratio=37:53:10) target; and a ZnS—SiO$_2$ dielectric layer having a film thickness of 30 nm was formed using a ZnS—SiO$_2$ (molecularity ratio=80:20) target.

The second information layer of the disc was evaluated in terms of C/N ratio, reliability, and signal quality as in Example 1. To evaluate the signal quality, the jitter was also evaluated. Here, if the jitter was 8.5% or less, the result is represented by "good", and if the jitter was more than 8.5%, the result is represented by "bad". This value is a reference value with which signal recording and reproduction can be performed without an error in the Blu-ray Disc format. The result of the evaluation is shown in Table 2.

TABLE 2

| Disc No. | First dielectric layer or reflection layer/dielectric layer | Number of layers | C/N ratio | Signal quality | Reliability |
|---|---|---|---|---|---|
| R | AlN | good | good | good | good |
| S | AgPdCu/ZrO$_2$—SiO$_2$—Cr$_2$O$_3$—LaF$_3$ | bad | good | good | insufficient |
| T | ZnS—SiO$_2$ | good | good | bad | good |

According to Table 2, the disc R was satisfactory in terms of all of the number of layers, C/N ratio, signal quality and reliability. However, the disc S has a larger number of layers, and therefore, is not preferable in terms of manufacturing cost. Also, a small amount of corrosion of Ag and S occurred in the disc S, resulting in less reliability. The disc T does not achieve a target value of signal quality.

Thus, according to the present invention, it was confirmed that, when the two-layer information recording medium includes a first dielectric layer made of AlN, having a thermal conductivity of as high as 0.01 W/K·cm or more and an extinction coefficient of 0 through 1.0 in a wavelength region in the vicinity of 405 nm, the two-layer optical information recording medium can have high signal quality and excellent reliability and can be provided at a low cost.

Although AlN was here used, it was also confirmed that a similar effect can be obtained by using BN, Si$_3$N$_4$, HfN, TaN, TiN, ZrN, SiC, BeO, Al$_2$O$_3$, MgO, ZnO, TiO$_2$, C, or NbC.

Example 3

An optical information recording medium having the layer structure of FIG. 3 (n=4) was fabricated, and the manufacture method will be described. A substrate was made of a polycarbonate resin. The substrate had a diameter of 12 cm, a thickness of 1.1 mm, a groove pitch of 0.32 μm, and a groove depth of 20 nm.

On a surface of the substrate in which a groove is formed, layers constituting a first information layer were formed by sputtering in the following order: a AgPdCu reflection layer having a film thickness of 40 nm was formed using a AgPdCu (weight ratio=98.1:0.9:1.0) target; a ZrO$_2$—SiO$_2$—Cr$_2$O$_3$—LaF$_3$ dielectric layer having a film thickness of 20 nm was formed using a ZrO$_2$—SiO$_2$—Cr$_2$O$_3$—LaF$_3$ (molecularity ratio=23:23:31:23) target; a Te—O—Pd recording layer having a film thickness of 20 nm was formed using a Te—O—Pd (atomicity ratio=37:53:10) target; and a ZnS—SiO$_2$ dielectric layer having a film thickness of 30 nm was formed using a ZnS—SiO$_2$ (molecularity ratio=80:20) target. An intermediate layer having a thickness of about 13.5 μm was formed on a surface of the first information layer using a UV-curable resin, where the same groove pattern as that of the substrate was transferred to the intermediate layer.

On a surface of this intermediate layer, layers constituting a second information layer were formed by sputtering in the following order: an AlN dielectric layer having a film thickness of 8 nm was formed using an AlN target; a Te—O—Pd recording layer having a film thickness of 6 nm was formed using a Te—O—Pd (atomicity ratio=37:53:10) target; and a ZnS dielectric layer having a film thickness of 27 nm was formed using a ZnS target. An intermediate layer having a thickness of 17.5 µm was formed on a surface of the second information layer using a UV-curable resin, where the same groove pattern as that of the substrate was transferred to the intermediate layer.

On a surface of this intermediate layer, layers constituting a third information layer were formed by sputtering in the following order: an AlN dielectric layer having a film thickness of 20 nm was formed using an AlN target; a Te—O—Pd recording layer having a film thickness of 8 nm was formed using a Te—O—Pd (atomicity ratio=37:53:10) target; and a ZnS dielectric layer having a film thickness of 35 nm was formed using a ZnS target. An intermediate layer having a thickness of 9.5 µm was formed on a surface of the third information layer using a UV-curable resin, where the same groove pattern as that of the substrate was transferred to the intermediate layer.

On a surface of this intermediate layer, layers constituting a fourth information layer were formed by sputtering in the following order: an AlN dielectric layer having a film thickness of 20 nm was formed using an AlN target; a Te—O—Pd recording layer having a film thickness of 6 nm was formed using a Te—O—Pd (atomicity ratio=37:53:10) target; and a ZnS dielectric layer having a film thickness of 45 nm was formed using a ZnS target. A light transparent layer having a thickness of 59.5 µm was formed on a surface of the fourth information layer using a UV-curable resin.

Each layer was formed using a target having a diameter of about 100 mm and a thickness of about 6 mm. The dielectric layer was formed using an RF power source of 300 W. The recording layer was formed using an RF power source of 100 W. The reflection layer was formed using a DC power source of 100 W. The AlN dielectric layer was formed using a gas mixture of Ar (25 sccm) and nitrogen (0.9 sccm). The recording layer was formed using a gas mixture of Ar (25 sccm) and oxygen (1.2 sccm). The ZnS dielectric layer, the $ZnS$—$SiO_2$ dielectric layer, the $ZrO_2$—$SiO_2$—$Cr_2O_3$—$LaF_3$ dielectric layer, and the AgPdCu reflection layer were formed using Ar (25 sccm). In each case, film formation was performed in an atmosphere in which a gas pressure was maintained at about 0.2 Pa. Thus, a disc U was fabricated.

Also, a disc V was fabricated by replacing the second to fourth information layers of the disc U with the following layers.

On the intermediate layer formed on the first information layer, layers constituting a second information layer were formed by sputtering in the following order: a $ZnS$—$SiO_2$ dielectric layer having a film thickness of 15 nm was formed using a $ZnS$—$SiO_2$ (molecularity ratio=80:20) target; a Te—O—Pd recording layer having a film thickness of 10 nm was formed using a Te—O—Pd (atomicity ratio=37:53:10) target; and a $ZnS$—$SiO_2$ dielectric layer having a film thickness of 20 nm was formed using a $ZnS$—$SiO_2$ (molecularity ratio=80:20) target. An intermediate layer having a thickness of 17.5 µm was formed on a surface of the second information layer using a UV-curable resin, where the same groove pattern as that of the substrate was transferred to the intermediate layer.

On a surface of this intermediate layer, layers constituting a third information layer were formed by sputtering in the following order: a $ZnS$—$SiO_2$ dielectric layer having a film thickness of 20 nm was formed using a $ZnS$—$SiO_2$ (molecularity ratio=80:20) target; a Te—O—Pd recording layer having a film thickness of 8 nm was formed using a Te—O—Pd (atomicity ratio=37:53:10) target; and a $ZnS$—$SiO_2$ dielectric layer having a film thickness of 30 nm was formed using a $ZnS$—$SiO_2$ (molecularity ratio=80:20) target. An intermediate layer having a thickness of 9.5 µm was formed on a surface of the third information layer using a UV-curable resin, where the same groove pattern as that of the substrate was transferred to the intermediate layer.

On a surface of this intermediate layer, layers constituting a fourth information layer were formed by sputtering in the following order: a $ZnS$—$SiO_2$ dielectric layer having a film thickness of 25 nm was formed using a $ZnS$—$SiO_2$ (molecularity ratio=80:20) target; a Te—O—Pd recording layer having a film thickness of 6 nm was formed using a Te—O—Pd (atomicity ratio=37:53:10) target; and a $ZnS$—$SiO_2$ dielectric layer having a film thickness of 30 nm was formed using a $ZnS$—$SiO_2$ (molecularity ratio=80:20) target. A light transparent layer having a thickness of 59.5 µm was formed on a surface of the fourth information layer using a UV-curable resin. Thus, the disc V was fabricated.

Also, a disc W was fabricated by replacing the second to fourth information layers of the disc U with the following layers.

On the intermediate layer having a thickness of 13.5 µm formed on the first information layer, a second information layer having layers was formed by sputtering in the following order: a AgPdCu reflection layer having a film thickness of 3 m was formed using a AgPdCu (weight ratio=98.1:0.9:1.0) target; a $ZrO_2$—$SiO_2$—$Cr_2O_3$—$LaF_3$ dielectric layer having a film thickness of 35 nm was formed using a $ZrO_2$—$SiO_2$—$Cr_2O_3$—$LaF_3$ (molecularity ratio=23:23:31:23) target; a Te—O—Pd recording layer having a film thickness of 6 nm was formed using a Te—O—Pd (atomicity ratio=37:53:10) target; and a ZnS dielectric layer having a film thickness of 20 nm was formed using a ZnS target. An intermediate layer having a thickness of 17.5 µm was formed on a surface of the second information layer using a UV-curable resin, where the same groove pattern as that of the substrate was transferred to the intermediate layer.

On this intermediate layer, layers constituting a third information layer were formed by sputtering in the following order: a AgPdCu reflection layer having a film thickness of 3 nm was formed using a AgPdCu (weight ratio=98.1:0.9:1.0) target; a $ZrO_2$—$SiO_2$—$Cr_2O_3$—$LaF_3$ dielectric layer having a film thickness of 20 nm was formed using a $ZrO_2$—$SiO_2$—$Cr_2O_3$—$LaF_3$ (molecularity ratio=23:23:31:23) target; a Te—O—Pd recording layer having a film thickness of 4 nm was formed using a Te—O—Pd (atomicity ratio=37:53:10) target; and a ZnS dielectric layer having a film thickness of 10 nm was formed using a ZnS target. An intermediate layer having a thickness of 9.5 µm was formed on a surface of the third information layer using a UV-curable resin, where the same groove pattern as that of the substrate was transferred to the intermediate layer.

On this intermediate layer, a AgPdCu reflection layer having a film thickness of 3 nm was formed using a AgPdCu (weight ratio=98.1:0.9:1.0) target, a $ZrO_2$—$SiO_2$—$Cr_2O_3$—$LaF_3$ dielectric layer having a film thickness of 10 nm was formed using a $ZrO_2$—$SiO_2$—$Cr_2O_3$—$LaF_3$ (molecularity ratio=23:23:31:23) target, a Te—O—Pd recording layer having a film thickness of 4 nm was formed using a Te—O—Pd (atomicity ratio=37:53:10) target, and a ZnS dielectric layer having a film thickness of 10 nm was formed using a ZnS target. These layers were formed, by sputtering, one on the top of another in the stated order. These layers constitute a fourth information layer. A light transparent layer having a thickness of 59.5 μm was formed on a surface of the fourth information layer using a UV-curable resin.

Thus, the disc W was fabricated.

The second to fourth information layers of the above-described disc were evaluated in terms of C/N ratio and signal quality as in Examples 1 and 2. The reflectance of each of the four layers was also evaluated. Here, when the reflectance of an unrecorded portion (groove portion) was 4.0% or more, the result is represented by "good", and when the reflectance was less than 4.0%, the result is represented by "bad". Only when a satisfactory result was obtained for all of the layers, the result is represented by "good", and when a satisfactory result was not obtained in all of the layers, the result is represented by "bad".

TABLE 3

| Disc No. | First dielectric layer or reflection layer/ dielectric layer | C/N ratio | Signal quality | Reflectance |
|---|---|---|---|---|
| U | AlN | good | good | good |
| V | ZnS—SiO$_2$ | good | bad | good |
| W | Ag Pd Cu/ ZrO$_2$—SiO$_2$—Cr$_2$O$_3$—LaF$_3$ | good | good | bad |

According to Table 3, the disc U was satisfactory in terms of all of C/N ratio, signal quality, and reflectance. However, the disc V was not satisfactory in terms of signal quality. In the disc W, the reflectance decreased with the layer depth as viewed from the laser incident side, so that a reflectance of 4% was not able to be obtained in any of the layers.

Thus, according to the present invention, it was confirmed that a highly reliable four-layer optical information recording medium having both a high transmittance and high signal quality can be provided by using, as a material for the first dielectric layer, AlN having a thermal conductivity of as high as 0.01 W/K·cm or more, and an extinction coefficient of 0 through 1.0 in a wavelength region in the vicinity of 405 nm.

Example 4

An optical information recording medium having the layer structure of FIG. 3 (n=4) will be described, where signal quality was balanced between all of the layers by designing the reflectance of each information layer. Here, the first information layer is represented by L0, the second information layer is represented by L1, the third information layer is represented by L2, and the fourth information layer is represented by L3. The disc was fabricated in a manner similar to that for the disc T of Example 3. Here, the reflectance of each information layer was adjusted by adjusting the film thickness of the ZnS dielectric layer. Three kinds of four-layer optical information recording media (X, Y, Z) were fabricated, where the information layers had respective reflectances shown in Table 4.

TABLE 4

| Disc No. | Information layer | Reflectance | Signal quality |
|---|---|---|---|
| X | L0 | 4.0 | good |
|  | L1 | 5.0 | good |
|  | L2 | 4.6 | good |
|  | L3 | 4.1 | good |

TABLE 4-continued

| Disc No. | Information layer | Reflectance | Signal quality |
|---|---|---|---|
| Y | L0 | 4.0 | good |
|  | L1 | 4.6 | insufficient |
|  | L2 | 5.0 | good |
|  | L3 | 4.1 | good |
| Z | L0 | 4.0 | good |
|  | L1 | 4.1 | insufficient |
|  | L2 | 4.6 | good |
|  | L3 | 5.0 | good |

According to Table 4, in the disc X, the reflectances of the information layers satisfy L3<L2<L1, so that signal quality is balanced between L1, L2, and L3. However, in the disc Y, L3<L1 is satisfied while L2<L1 is not satisfied. Therefore, signal quality is not satisfactorily balanced between the layers. In the disc Z, L3>L2>L1 is satisfied, so that signal quality is even less satisfactorily balanced.

Thus, according to the present invention, it was confirmed that, when recording and reproduction light is incident to the four-layer optical information recording medium, the intensities of reflected light returning from the information layers satisfy L3<L2<L1, so that signal quality is balanced between L1, L2, and L3.

Example 5

An optical information recording medium having the layer structure of FIG. 3 (n=4) was fabricated, and the manufacture method will be described. Here, for each information layer, a reflection layer containing Ag as a major component was applied, or alternatively, instead of the reflection layer containing Ag as a major component, an AlN dielectric layer made of a material having a thermal conductivity of as high as 0.01 W/K·cm or more, and a extinction coefficient of 0 through 1.0 in a wavelength region in the vicinity of 405 nm was applied. Combinations of these cases are compared.

A substrate was made of a polycarbonate resin. The substrate had a diameter of 12 cm, a thickness of 1.1 mm, a groove pitch of 0.32 μm, and a groove depth of 20 nm.

On a surface of the substrate in which a groove is formed, layers constituting a first information layer were formed by sputtering in the following order: a AgPdCu reflection layer having a film thickness of 40 nm was formed using a AgPdCu (weight ratio=98.1:0.9:1.0) target; a ZrO$_2$—SiO$_2$—Cr$_2$O$_3$—LaF$_3$ dielectric layer having a film thickness of 20 nm was formed using a ZrO$_2$—SiO$_2$—Cr$_2$O$_3$—LaF$_3$ (molecularity ratio=23:23:31:23) target; a Te—O—Pd recording layer having a film thickness of 20 nm was formed using a Te—O—Pd (atomicity ratio=37:53:10) target; and a ZnS—SiO$_2$ dielectric layer having a film thickness of 30 nm was formed using a ZnS—SiO$_2$ (molecularity ratio=80:20) target. An intermediate layer having a thickness of about 13.5 μm was formed on a surface of the first information layer using a UV-curable resin, where the same groove pattern as that of the substrate was transferred to the intermediate layer.

On a surface of this intermediate layer, layers were formed by sputtering in the following order: a AgPdCu reflection layer having a film thickness of 3 nm was formed using a AgPdCu (weight ratio=98.1:0.9:1.0) target; a ZrO$_2$—SiO$_2$—Cr$_2$O$_3$—LaF$_3$ dielectric layer having a film thickness of 35 nm was formed using a ZrO$_2$—SiO$_2$—Cr$_2$O$_3$—LaF$_3$ (molecularity ratio=23:23:31:23) target; a Te—O—Pd recording layer having a film thickness of 6 nm was formed using a Te—O—Pd (atomicity ratio=37:53:10) target; and a ZnS dielectric layer having a film thickness of 20 nm was formed using a ZnS target. An intermediate layer having a thickness of 17.5 μm was formed on a surface of the resultant information layer using a UV-curable resin, where the same groove pattern as that of the substrate was transferred to the intermediate layer.

On a surface of this intermediate layer, an AlN dielectric layer having a film thickness of 20 nm was formed using an AlN target, a Te—O—Pd recording layer having a film thickness of 8 nm was formed using a Te—O—Pd (atomicity ratio=37:53:10) target, and a ZnS dielectric layer having a film thickness of 35 nm was formed using a ZnS target. These layers were formed, by sputtering, one on the top of another in the stated order. These layers constitute a third information layer. An intermediate layer having a thickness of 9.5 μm was formed on a surface of the third information layer using a UV-curable resin, where the same groove pattern as that of the substrate was transferred to the intermediate layer.

On a surface of this intermediate layer, layers constituting a fourth information layer were formed by sputtering in the following order: an AlN dielectric layer having a film thickness of 20 nm was formed using an AlN target; a Te—O—Pd recording layer having a film thickness of 6 nm was formed using a Te—O—Pd (atomicity ratio=37:53:10) target; and a ZnS dielectric layer having a film thickness of 45 nm was formed using a ZnS target. A light transparent layer having a thickness of 59.5 μm was formed on a surface of the fourth information layer using a UV-curable resin.

Each layer was formed using a target having a diameter of about 100 mm and a thickness of about 6 mm. The dielectric layer was formed using an RF power source of 300 W. The recording layer was formed using an RF power source of 100 W. The reflection layer was formed using a DC power source of 100 W. The AlN dielectric layer was formed using a gas mixture of Ar (25 sccm) and nitrogen (0.9 sccm). The recording layer was formed using a gas mixture of Ar (25 sccm) and oxygen (1.2 sccm). The ZnS dielectric layer, the ZnS—$SiO_2$ dielectric layer, the $ZrO_2$—$SiO_2$—$Cr_2O_3$—$LaF_3$ dielectric layer, and the AgPdCu reflection layer were formed using Ar (25 sccm). In each case, film formation was performed in an atmosphere in which a gas pressure was maintained at about 0.2 Pa. Thus, a disc AA was fabricated.

Also, a disc AB was fabricated by replacing the second information layer of the disc AA with the following layer.

On the intermediate layer formed on the first information layer, layers constituting a second information layer were formed by sputtering in the following order: an AlN dielectric layer having a film thickness of 8 nm was formed using an AlN target; a Te—O—Pd recording layer having a film thickness of 6 nm was formed using a Te—O—Pd (atomicity ratio=37:53:10) target; and a ZnS dielectric layer having a film thickness of 27 nm was formed using a ZnS target. An intermediate layer having a thickness of 17.5 μm was formed on a surface of the second information layer using a UV-curable resin, where the same groove pattern as that of the substrate was transferred to the intermediate layer. A third information layer and a light transparent layer were formed as in the disc AA. Thus, the disc AB was fabricated.

Also, a disc AC was fabricated by replacing the first and second information layers of the disc AA with the following layers.

On a surface of the substrate in which a groove is formed, layers constituting a first information layer were formed by sputtering in the following order: an AlN dielectric layer having a film thickness of 20 nm was formed using an AlN target; a Te—O—Pd recording layer having a film thickness of 20 nm was formed using a Te—O—Pd (atomicity ratio=37:53:10) target; and a ZnS dielectric layer having a film thickness of 30 nm was formed using a ZnS target. An intermediate layer having a thickness of about 13.5 μm was formed on a surface of the first information layer using a UV-curable resin, where the same groove pattern as that of the substrate was transferred to the intermediate layer. On a surface of the intermediate layer formed on the first information layer, layers constituting a second information layer were formed by sputtering in the following order: an AlN dielectric layer having a film thickness of 8 nm was formed using an AlN target, a Te—O—Pd recording layer having a film thickness of 6 nm was formed using a Te—O—Pd (atomicity ratio=37:53:10) target, and a ZnS dielectric layer having a film thickness of 27 nm was formed using a ZnS target. An intermediate layer having a thickness of 17.5 μm was formed on a surface of the second information layer using a UV-curable resin, where the same groove pattern as that of the substrate was transferred to the intermediate layer. A third information layer and a light transparent layer were formed as in the disc AA. Thus, the disc AC was fabricated.

Also, a disc AD was fabricated by replacing the third information layer of the disc AA with the following layer.

On the intermediate layer formed on the second information layer, layers constituting a third information layer were formed by sputtering in the following order: a AgPdCu reflection layer having a film thickness of 3 nm was formed using a AgPdCu (weight ratio=98.1:0.9:1.0) target; a $ZrO_2$—$SiO_2$—$Cr_2O_3$—$LaF_3$ dielectric layer having a film thickness of 35 nm was formed using a $ZrO_2$—$SiO_2$—$Cr_2O_3$—$LaF_3$ (molecularity ratio=23:23:31:23) target; a Te—O—Pd recording layer having a film thickness of 6 nm was formed using a Te—O—Pd (atomicity ratio=37:53:10) target; and a ZnS dielectric layer having a film thickness of 20 nm was formed using a ZnS target. An intermediate layer having a thickness of 9.5 μm was formed on a surface of the third information layer using a UV-curable resin, where the same groove pattern as that of the substrate was transferred to the intermediate layer. A fourth information layer and a light transparent layer were formed as in the disc AA. Thus, the disc AD was fabricated.

The information layers of the above-described disc were all evaluated in terms of reflectance as in Example 4. Here, when the reflectance of an unrecorded portion (groove portion) was 4.0% or more, the result is represented by "good", and when the reflectance was less than 4.0%, the result is represented by "bad". Only when a satisfactory result was obtained for all of the layers, the result is represented by "good", and when a satisfactory result was not obtained in all of the layers, the result is represented by "bad".

TABLE 5

| Disc No. | First information layer | Second information layer | Third information layer | Fourth information layer | Reflectance |
|---|---|---|---|---|---|
| AA | with reflection layer | with reflection layer | with AlN | with AlN | good |
| AB | with reflection layer | with AlN | with AlN | with AlN | good |
| AC | with AlN | with AlN | with AlN | with AlN | bad |
| AD | with reflection layer | with reflection layer | with reflection layer | with AlN | bad |

According to Table 5, in the disc AA and AB, a target reflectance value was achieved for all of the information layers.

However, the disc AC was not able to secure a reflectance of 4% for the first information layer. Also, the disc AD was not able to secure a reflectance of 4% for the first information layer.

Thus, according to the present invention, in the four-layer optical information recording medium, the first information layer and the second information layer were provided with a reflection layer containing Ag as a major component, and the third information layer and the fourth information layer were provided with an AlN dielectric layer made of a material having a thermal conductivity of as high as 0.01 W/K·cm or more, and an extinction coefficient of 0 through 1.0 in a wavelength region in the vicinity of 405 nm without using a reflection layer containing Ag as a major component. In this case, it was confirmed that the four-layer optical information recording medium can achieve a target reflectance in all of the information layers.

Alternatively, the first information layer was provided with a reflection layer containing Ag as a major component, and the second, third and fourth information layers were each provided with an AlN dielectric layer made of a material having a thermal conductivity of as high as 0.01 W/K·cm or more, and an extinction coefficient of 0 through 1.0 in a wavelength region in the vicinity of 405 nm without using a reflection layer containing Ag as a major component. In this case, it was confirmed that the four-layer optical information recording medium can achieve a target reflectance in all of the information layers.

The present invention is effective for an optical information recording medium that can simultaneously achieve both a high transmittance and high signal quality, increase the reliability of long-term conservation, and reduce manufacturing cost, and a method for manufacturing the same.

The invention claimed is:

1. An optical information recording medium comprising:
   at least one information layer on a substrate, wherein
   said at least one information layer has a recording layer and a dielectric layer,
   said recording layer contains Te, O, and M (M being at least one element selected from Au, Pd, and Pt) as major components,
   said dielectric layer has an extinction coefficient of 0 through 1.0, inclusive, and said dielectric layer contains a material having, as a major component, at least one component selected from AlN, BN, HfN, TaN, TiN, ZrN, BeO, $Al_2O_3$, MgO, ZnO, C, and NbC, and
   wherein in said at least one information layer having said dielectric layer, no reflection layer is provided.

2. The optical information recording medium according to claim 1, wherein a proportion of the Te is within a range of 20 through 50 atom % inclusive, a proportion of the O is within a range of 40 through 70 atom % inclusive, and a proportion of the Pd is within a range of 3 through 20 atom % inclusive.

3. The optical information recording medium according to claim 1, wherein said dielectric layer has a film thickness of 1 nm through 40 nm inclusive.

4. The optical information recording medium according to claim 1, wherein said dielectric layer contains a material having, as a major component, at least one selected from AlN, BN, $Al_2O_3$, and MgO.

5. The optical information recording medium according to claim 1, wherein said recording layer has a film thickness of 1 nm through 30 nm inclusive.

6. An optical information recording medium comprising:
   n information layers (n is an integer of 3 or more) on a substrate, wherein
   each layer, from a second information layer L1 to an $n^{th}$ information layer Ln−1, has a recording layer and a dielectric layer, where an information layer disposed farthest from a recording/reproducing light incident side is represented by a first information layer L0, and other information layers are represented by said second information layer L1, ..., and said $n^{th}$ information layer Ln−1 successively toward said incident side,
   each said recording layer contains Te, O, and M (M being at least one element selected from Au, Pd, and Pt) as major components,
   each said dielectric layer has an extinction coefficient of 0 through 1.0 inclusive, contains a material having, as a major component, at least one component selected from AlN, BN, HfN, TaN, TiN, ZrN, BeO, $Al_2O_3$, MgO, ZnO, C, and NbC, and
   wherein in each said information layer having said dielectric layer, no reflection layer is provided.

7. The optical information recording medium according to claim 6, wherein
   said n information layers includes four information layers (n=4), and
   said information layers are configured such that intensities of reflected light from said information layers of the incident recording/reproduction light have a relationship represented by L3<L1.

8. The optical information recording medium according to claim 6, wherein
   said n information layers includes four information layers (n=4), and
   said information layers are configured such that intensities of reflected light from said information layers of the incident recording and reproduction light have a relationship represented by L2<L1.

9. A method for manufacturing the optical information recording medium according to claim 1, comprising
   forming, on the substrate, the recording layer containing Te, O, and M (M at least one element selected from Au, Pd, and Pt) as major components, and the dielectric layer containing, as a major component, at least one component selected from AlN, BN, HfN, TaN, TiN, ZrN, BeO, $Al_2O_3$, MgO, ZnO, C, and NbC, using a vapor-phase thin film deposition technique.

10. An optical information recording medium comprising:
    a substrate;
    a first information layer formed on said substrate;
    a first intermediate layer formed on top of said first information layer;
    a second information layer formed on top of said first intermediate layer;
    a second intermediate layer formed on top of said second information layer;
    a third information layer formed on top of said second intermediate layer;
    a third intermediate layer formed on top of said third information layer;
    a fourth information layer formed on top of said third intermediate layer; and
    a light transparent layer formed on top of said fourth information layer,
    wherein each of said first through fourth information layers has at least a recording layer containing Te, O, and M (M is at least element selected from Au, Pd, and Pt) as major components,
    said first information layer further has a reflection layer containing an Ag alloy or an Al alloy as a major component, each of said third information layer and said fourth information layer further has a dielectric layer containing, as a major component, at least one component selected from AlN, BN, HfN, TaN, TiN, ZrN, BeO, $Al_2O_3$, MgO, ZnO, C, and NbC, and wherein in each said information layer having said dielectric layer, no reflection layer is provided.

11. The optical information recording medium according to claim 10, wherein said second information layer further has a reflection layer containing an Ag alloy or an Al alloy as a major component.

12. The optical information recording medium according to claim 10, wherein the said second information layer further has a dielectric layer containing, as a major component, at least one component selected from AlN, BN, HfN, TaN, TiN, ZrN, BeO, $Al_2O_3$, MgO, ZnO, C, and NbC.

13. The optical information recording medium according to claim 10, wherein each of said first intermediate layer, said second intermediate layer, said third intermediate layer, and said light transparent layer contains at least one selected from polycarbonate resin, polymethylmethacrylate resin, polyolefin resin, norbornene resin, and UV-curable resin.

14. The optical information recording medium according to claim 10, wherein each of said substrate, said first intermediate layer, said second intermediate layer, said third intermediate layer, and said light transparent layer has a refractive index within a range of 1.4 through 1.7.

15. The optical information recording medium according to claim 10, wherein said first intermediate layer, said second intermediate layer, and said third intermediate layer have different thicknesses, the thicknesses of said first, second and third intermediate layers satisfy a relationship: the thickness of said third intermediate layer<the thickness of said first intermediate layer<the thickness of said second intermediate layer, and the thickness of said third intermediate layer is 6 μm through 15 μm.

16. An optical information recording medium comprising:

a substrate;

a first information layer formed on top of said substrate;

a second information layer formed on top of said first information layer;

a third information layer formed on top of said second information layer;

a fourth information layer formed on top of said third information layer; and a light transparent layer formed on top of said fourth information layer, wherein each of said first information layer, said second information layer, said third information layer, and said fourth information layer has a recording layer, each said recording layer contains Te, O, and M (M is at least one element selected from Au, Pd, and Pt) as major components, A:B:C:D=1:0.2 through 0.7:0.2 through 0.6:0.2 through 0.5 where a film thickness of said recording layer in said first information layer is represented by A, a film thickness of said recording layer in said second information layer is represented by B, a film thickness of said recording layer in said third information layer is represented by C, and a film thickness of said recording layer in said fourth information layer is represented by D, wherein each of said third information layer and said fourth information layer further has a dielectric layer containing, as a major component, at least one component selected from AlN, BN, HfN, TaN, TiN, ZrN, BeO, $Al_2O_3$, MgO, ZnO, C, and NbC, and wherein in each said information layer having said dielectric layer, no reflection layer is provided.

* * * * *